US008077646B1

(12) United States Patent
Cendrillon et al.

(10) Patent No.: US 8,077,646 B1
(45) Date of Patent: Dec. 13, 2011

(54) EQUALIZATION IN A WIRELESS MULTIPLE ACCESS COMMUNICATION SYSTEM

(75) Inventors: Raphael Cendrillon, Kennedy Town (HK); Robert Ayrapetian, Morgan Hill, CA (US)

(73) Assignee: Marvell International Ltd., Hamilton (BM)

( * ) Notice: Subject to any disclaimer, the term of this patent is extended or adjusted under 35 U.S.C. 154(b) by 759 days.

(21) Appl. No.: 12/167,911

(22) Filed: Jul. 3, 2008

Related U.S. Application Data

(60) Provisional application No. 60/947,818, filed on Jul. 3, 2007.

(51) Int. Cl.
*H04B 7/00* (2006.01)
(52) U.S. Cl. .................................................. 370/310
(58) Field of Classification Search .................. None
See application file for complete search history.

(56) References Cited

U.S. PATENT DOCUMENTS

| | | | | |
|---|---|---|---|---|
| 6,304,599 | B1 * | 10/2001 | Igarashi | 375/232 |
| 6,983,125 | B2 * | 1/2006 | Smee et al. | 455/63.1 |
| 7,230,911 | B2 * | 6/2007 | Jacobsen | 370/208 |
| 2002/0012391 | A1 * | 1/2002 | Ahn | 375/232 |
| 2004/0042543 | A1 * | 3/2004 | Li et al. | 375/222 |
| 2005/0135496 | A1 * | 6/2005 | Pisoni | 375/260 |
| 2005/0174981 | A1 * | 8/2005 | Heath et al. | 370/342 |
| 2005/0190715 | A1 * | 9/2005 | McNamara | 370/319 |
| 2008/0075179 | A1 * | 3/2008 | Li | 375/260 |

OTHER PUBLICATIONS

Van Acker et al., "Per Tone Equalization for DMT-Based Systems," *IEEE Transactions on Communications*, vol. 49, No. 1, pp. 109-1119, Jan. 2001.

* cited by examiner

*Primary Examiner* — Chi Pham
*Assistant Examiner* — Fan Ng

(57) ABSTRACT

An equalization method and apparatus for a communication system having a first transceiver device that communicates with each of a plurality of second transceiver devices receives a data transmission over a subset of frequency sub-carriers allotted to each second transceiver device. The communication channel between first transceiver device and the plurality of second transceiver devices is partitioned in a plurality of frequency sub-carriers of which the frequency sub-carriers allotted to a second transceiver device is a subset. The data transmission is transformed from a time-domain transmission to a frequency domain transmission. An equalization filter is applied separately to each of the frequency sub-carriers within the subset of frequency sub-carriers.

26 Claims, 9 Drawing Sheets

EQUALIZATION IN A WIRELESS MULTIPLE ACCESS COMMUNICATION SYSTEM

RELATED APPLICATION

This application claims priority to U.S. Provisional Patent Application Ser. No. 60/947,818, entitled "Application of Per-Tone Equalization to OFDMA System," which was filed on Jul. 3, 2007, the entire disclosure of which is hereby incorporated by reference herein.

FIELD OF THE TECHNOLOGY

The disclosure relates generally to wireless communication systems and, more particularly, to techniques for equalization in a multiple access wireless communication system.

DESCRIPTION OF THE RELATED ART

Orthogonal frequency-division multiplexing (OFDM) is a digital multi-carrier modulation scheme that employs a large number of relatively closely spaced orthogonal sub-carriers. Each sub-carrier is itself modulated with a modulation scheme such as quadrature amplitude modulation, phase shift keying, etc., at a relatively low symbol rate. Even though data on a particular sub-carrier is modulated at a low symbol rate, the large number of sub-carriers provides an overall data rate similar to single-carrier modulation schemes that utilize the same bandwidth. An advantage of OFDM over single-carrier modulation schemes is its ability to cope with severe channel conditions such as, multipath and narrowband interference. For instance, the relatively low symbol rate allows the use of a guard interval between symbols to help manage time-domain spreading of the signal due to multipath propagation.

Being a digital multi-carrier modulation scheme, OFDM is used for transferring one-bit streams over a single communication channel using one sequence of OFDM symbols. However, OFDM is not a multi-user channel access technique. That is, OFDM does not utilize a multi-access modulation scheme to support multiple users at high data rates, though OFDM can be combined with multiple access using time, frequency or coding separation of the users. An example of OFDM combined with multiple access is Orthogonal Frequency Division Multiple Access (OFDMA). In OFDMA, frequency-division multiple access is achieved by assigning a subset of different sub-carriers within the communication channel to different users. The sub-carriers may also be referred to as tones or frequency bands within the overall frequency band of the communication channel. OFDMA may be used multiple-access communication systems, such as the Third Generation Partnership Project Long Term Evolution (3G LTE), the IEEE 802.16 Wireless MAN standard, also referred to as Worldwide Interoperability for Microwave Access (WiMAX), or other systems employing the IEEE 802.16 family of communication standards.

Multiple-access communication systems typically include one or more base stations and two or more remote stations that communicate with the one or more base stations by transmitting data in a plurality of time slots and frequency sub-carriers within a predetermined communication spectrum available for the multiple-access communication system. The time and frequency resources used in such communication systems are often divided into a series of frames, each comprising one or more frequency reuse spectra or frequency reuse zones, which are further refined or divided into subsets comprising one or more orthogonal sub-carriers and one or more symbols per sub-carrier. Symbols may be modulated on sub-carriers using OFDMA or using any other desired modulation scheme consistent with multiple-access communication. A base station allocates the non-overlapping sub-carrier subsets available in each frequency reuse zone at any given time among the remote stations communicating with that base station at that time. In the downlink of an OFDMA system, the base station transmits to the multiple remote states in the frequency domain and modulation being implemented via the fast Fourier transform. The allocation of non-overlapping sub-carriers to different users helps to avoid interference between different remote stations, known as intra-cell interference. In carrying out these allocations, the base station seeks to attain performance goals such as maximizing system capacity or minimizing power consumption.

FIG. 1 is a block diagram of an example OFDMA receiver 100. The receiver 100 includes a radio frequency (RF) demodulator 104 that receives an OFDMA signal that has been modulated on an RF carrier and demodulates the OFDMA signal to baseband or an intermediate frequency (IF). The RF demodulator 104 is coupled to an automatic gain control (AGC) block 108, which is in turn coupled to an analog-to-digital converter (ADC) 112. The AGC block 108 includes a variable gain amplifier with a gain that is adjusted in an attempt to optimally fit the output of the RF demodulator 104 within a dynamic range of the ADC 112.

A timing correction block 116 is coupled to the ADC 112, and processes an output of the ADC 112 ($\hat{y}(n)$) to compensate for timing errors due to, for example, a carrier frequency offset and/or a sampling period offset. An output of the timing correction block 116 ($y(n)$), which are vectors denoting the data received at the receiver, includes signal information corresponding to OFDMA symbols and signal information corresponding to guard intervals, which may include a cyclic prefix, for example. At a cyclic prefix strip block 118, the cyclic prefix is removed from the signal information in the data.

The cyclic prefix strip block 118 output, which corresponds to the symbols received across the total number of sub-carriers K in the channel, is provided to a fast Fourier transform calculation block 120 (such as a Fourier transform (FFT) block) to which the cyclic prefix strip block 118 is coupled. The FFT block 120 performs an FFT operation on the symbols in the set of K sub-carriers in the channel and converts the symbols to the frequency domain. The tones or sub-carriers allotted to the receiver 100 are selected at a tone selection block 122. The data on each allotted sub-carrier is then equalized by a single multiplication operation performed on each sub-carrier with the inverse of the channel frequency response $\hat{H}_n(k)$. Generally, this is referred to as 1-tap frequency domain equalization. The number of taps generally refers to the number of components or coefficients in the equalization function. The equalization attempts to extract OFDMA symbols from the signal $y(n)$ in the frequency domain to generate vectors $\hat{x}_n(K_n)$, generally denoting the data (or an approximation thereof) intended for the user. A demodulator (not shown) may then be provided to demodulate each of the signals to generate an information signal.

Due to the high bandwidth used in these systems, the inherent non-linear frequency response of a channel (channel memory) causes inter-symbol interference (ISI), which, if left untreated, can significantly degrade performance. Generally speaking, ISI is a distortion of a transmission in which one symbol interferes with subsequent symbols, and often occurs as a result of multi-path propagation, where transmissions bounce or reflect off of surrounding objects. For example, a remote station may receive not only line-of-sight transmissions from the base station, but may also receive reflections of the transmission off of surrounding buildings. The transmission reflections have a longer path of travel than the corresponding line-of-sight transmission and are therefore delayed in being received by the remote station as compared to the line-of-sight transmission. ISI can cause the orthogonality of the different sub-carriers to be lost, leading to interference between the signals intended for the different users in the system.

In environments where the base station and remote station are close to the objects, such as in urban environments, the path of travel for the transmission reflections is comparable to the path of travel for the line-of sight transmission. That is, the objects are closer to the base station and remote station, such that the delay between receiving the line-of-sight transmission and the transmission reflection is small, thereby causing little distortion of subsequent symbols, though such distortion may still exist. In environments where the base station and remote station are further apart from the objects, such as in suburban or rural environments, the path length of the transmission reflections may become much longer and the distortions are more pronounced. As such, the delay between the line-of-sight transmission and the transmission reflection is larger, and may result in the symbol in the transmission reflection being at least partly received while a subsequent symbol is received in the line-of-sight transmission.

One technique for preventing ISI is the introduction of the cyclic prefix appended to the beginning of each symbol, as mentioned above. Generally, the cyclic prefix is a copy of an ending portion of a data block being transmitted in a symbol, which is inserted in the guard interval that precedes the symbol. For example, in a 100 sample long communication channel, the transmission of 1000 units of data in a data block may have 100 of those units copied to the front of the transmission. This provides a circular or cyclical structure to the data, thereby making the data appear periodic, which allows the multi-path propagation signal to settle before the actual data block arrives at the receiver. That is, the addition of the cyclic prefix causes the channel to perform a circular convolution, where the channel previously performed a linear convolution without the cyclic prefix. Equalization with linear convolution (i.e., without the cyclic prefix) tends to mix the sub-carriers, thereby making the decoding more complex. On the other hand, when performing frequency domain equalization with the cyclic prefix, the circular convolution is simply a multiplication by a constant, as discussed with reference to FIG. 1.

The receiver then decodes the symbols after the signal settles, because the sub-carriers become orthogonal to one another, provided that the length of the cyclic prefix is longer than the impulse response (or delay spread) of the channel. The use of cyclic prefixes generally performs well in urban environments, where the size of the cell is smaller than in rural environments, and the length of the cyclic prefix is shorter than the impulse response of the channel. However, in rural or suburban environments, where the size of the cell is larger, the length of the channel impulse response is often larger than the length of the cyclic prefix. As a result, the orthogonality of the sub-carriers is lost and performance degrades.

In order to retain orthogonality of the sub-carriers, a proposed solution to the channel impulse response being longer than the cyclic prefix is to support an additional mode that supports an extended cyclic prefix. The mode would be enabled in, for example, rural or suburban environments, and the chosen extended cyclic prefix would be longer than the channel impulse response. However, the cyclic prefix is essentially part of the overhead of the transmission, and an increased cyclic prefix increases the transmission overhead, thereby leaving less room for the data block being transmitted. For example, the standard cyclic prefix in 3G LTE uses 14 samples from every 2048 sample block, resulting in an overhead that accounts for 7% of the transmission. The extended cyclic prefix uses 512 samples from every 2048 sample block, resulting in an overhead that accounts for 25% of the transmission. As a result, the extended cyclic prefix leads to a reduction in data-rate by 18%, as compare to the data-rate with a standard cyclic prefix.

Some wireline communication systems, such as digital subscriber line (DSL) systems, utilize digital multi-carrier modulation schemes, such as OFDM, for transferring one bit streams over a single communication channel using one sequence of symbols. As discussed above, OFDM is similar to OFDMA, except that it is a single user system, with the DSL central modem transmitting to one only customer premises modem (i.e., one receiver) per channel. That is, the data is transmitted over all channel frequencies, rather than over allotted, discrete channel sub-carriers. These communication systems also encounter problems similar to the cyclic prefix being shorter than the channel impulse response. Generally, a linear finite impulse response (FIR) filter, known as a time-domain equalizer (TEQ) is used to help "shorten" the impulse response of the channel.

FIG. 2 is a block diagram of an example wireline communication system 150 using time-domain equalization. The wireline communication system 150 includes a transmitter 152, such as the central office modem, the communication channel 154, and a receiver 156, such as a user modem. Data intended for the user x(K) is provided to an inverse fast Fourier transform calculation block 158 (such as an inverse Fourier transform (IFFT) block) to place the data in the time domain. As mentioned above, the data is transmitted to the user over all channel sub-carriers K of the communication channel. The IFFT block 158 performs an IFFT operation on all data over all sub-carriers K and adds the cyclic prefix to the OFDM symbols at a cyclic prefix block 160. The OFDM symbols are transmitted over all channel sub-carriers K though the communication channel 154. The impulse response of the channel 154 is expressed as a vector h=[h(1), . . . h($L_{channel}$)] 162, and $L_{channel}$ denotes the channel length. As the OFDM symbols are transmitted through the channel, background noise z is added to the transmission, resulting in the data or OFDM symbols received by the receiver 156, denoted as a vector y.

At the receiver 156, the data y is equalized by a time domain equalizer (TEQ) 164, where the vector w=⌊w(1), . . . w($L_{TEQ}$)⌋ contains the coefficients of the TEQ, and $L_{TEQ}$ is the length of the filter, where the length of the filter is an expression of the number of coefficients in the filter equation. After application of the TEQ, the effective impulse response of the channel $h_{eff}$ is a convolution of the channel impulse response h and the TEQ coefficients w ($h_{eff}$=h⊗w). Thereafter, the receiver 158 removes the cyclic prefix from the OFDM symbols at a cyclic prefix strip block 166, and the OFDM symbols, as transmitted over all sub-carriers K, is provided to a fast Fourier transform calculation block 168 (such as a Fourier transform (FFT) block). The FFT block 168 performs an FFT operation on the OFDM symbols within set of K sub-carriers in the channel to convert the OFDM symbols to the frequency domain, thereby generating a set of signal samples corresponding to an OFDM symbol. The inverse of the frequency response is then applied to each sub-carrier, where H(K) denotes the frequency response of the effective channel $h_{eff}$ on sub-carrier k. The TEQ coefficients w are chosen such that the majority of the energy in the effective impulse response $h_{eff}$ falls within the cyclic prefix:

$$w^* = \arg\max_w \sum_{l=1}^{L_{CP}} |h_{eff}[l]|^2 \quad \text{(equ. 1)}$$

In effect, the equalizer is applied in the time domain to perform linear convolution. That is, the combination of the equalizer and the channel to create a new channel that is shorter than the communication channel and has an impulse response that is shorter than the length of the cyclic prefix. For example, the energy of the channel is pushed into the first 5 ms. This helps to minimize the ISI in the wireless system 150, because only the part of the effective impulse response $h_{eff}$ lying outside the cyclic prefix causes ISI.

However, the TEQ technique, and particularly the above equation, is a non-convex optimization problem. This means that there is no closed form solution available for the design of the TEQ coefficients w. Instead, the coefficients w are chosen using iterative, numerical training algorithms, such least mean squares (LMS). But because the underlying problem is still non-convex, such iterative approaches frequently become trapped within local optima without fining the globally optimal solution, which leads to sub-optimal performance. For example, depending on where the starting point is for determining a solution, the technique my find a solution different from the globally optimal solution, without knowing that the solution is actually only a locally optimal solution.

SUMMARY

In one embodiment, a method of equalization within a communication system is disclosed. The communication system has a first transceiver device and a plurality of second transceiver devices, where the first transceiver device communicates with each of the second transceiver devices via a subset of frequency sub-carriers allotted to each second transceiver device. The method includes receiving a data transmission over the subset of frequency sub-carriers, transforming the data transmission from a time-domain transmission to a frequency domain transmission, and applying a separate equalization filter to each of the frequency sub-carriers within the subset of frequency sub-carriers. The communication channel between the first transceiver device and the plurality of second transceiver devices is partitioned in a plurality of frequency sub-carriers of which the frequency sub-carriers allotted to a second transceiver device is a subset.

In another embodiment, a method of per-tone equalization in a transceiver of a multi-access communication system is disclosed. The multi-access communication system includes a plurality of tones allocated among a plurality of transceivers without overlap and each transceiver communicates among the allocated plurality of tones. The method includes receiving a data transmission over the plurality of tones allocated to the transceiver, transforming the data transmission from a time-domain transmission to a frequency domain transmission, and applying an equalization filter to each tone allocated to the transceiver based on a severity of inter-symbol interference on the data-rate for the tone.

In a further embodiment, an apparatus for equalizing an orthogonal frequency-division multiple access (OFDMA) signal is disclosed. The apparatus includes a sliding fast Fourier transform unit adapted to transform a pre-Fourier transform OFDMA signal from the time domain to a post-Fourier transform OFDM signal in the frequency domain, and a per-tone equalizer adapted to apply an equalization filter to each tone allocated to the apparatus by a transmission apparatus, wherein the per-tone equalizer is adapted to apply the equalization filter based on a severity of inter-symbol interference on the data-rate associated with each tone allocated to the apparatus.

DETAILED DESCRIPTION

Figure 3:
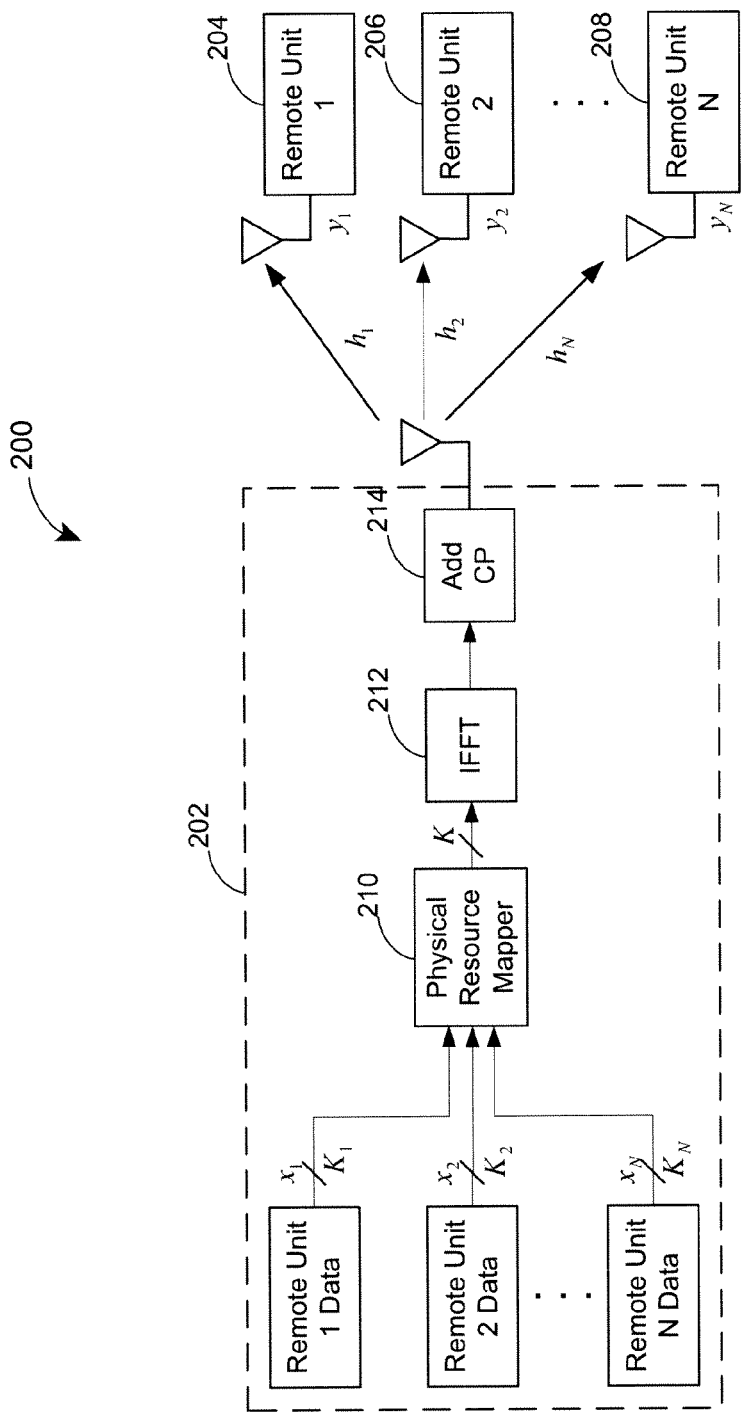
FIG. 3 is a block diagram of an example OFDMA wireless communication system.

FIG. 3 depicts an exemplary communication system 200 in connection with which equalization methods and apparatus described herein may be used. More particularly, the equalization techniques may be used in cellular and other communication systems and may employ the IEEE 802.16 family of communication standards or any other multiple access communication techniques, such as to provide for communication among one or more base stations and a plurality of remote stations, which may be either fixed (i.e., stationary) or mobile stations. The exemplary communication system 10 illustrated in FIG. 1 includes one base station 202 and three remote stations 204, 206, 208. As used herein remote station and receiver may be utilized interchangeably without departing from the scope of the equalization techniques described herein.

In multiple access communication systems, such as systems employing WiMAX (WiMAX systems) or 3G LTE as well as, more generally, cellular and other communication systems for providing voice, data, audio, and video communication, efficient operation requires careful allocation of available time and frequency resources among all remote stations using the system to achieve performance objectives such as maximum usage, quality of service requirements, and fairness to users, for example. For explanatory purposes, an exemplary WiMAX system as shown in FIG. 3 is described herein, but those of ordinary skill in the art will appreciate that equalization techniques described herein also may be used in any other multiple access communication system. Further, the equalization techniques may be practiced in connection with communication systems employing modulation schemes other than the orthogonal frequency-division multiple access (OFDMA) typically employed by WiMAX systems.

In order to support a large number of users at high data rates, communication systems, such as the one shown in FIG. 3, are based on orthogonal frequency division multiple access (OFDMA). In the downlink of an OFDMA system, the base station 202 transmits to multiple remote stations or receivers 204, 206, 208. The transmission occurs in the frequency domain, with the available spectrum divided into orthogonal sub-carriers or tones. Modulation is implemented via the fast Fourier transform.

As described above, in order to keep the signals intended for the different mobiles from interfering, each remote station 204, 206, 208 is allocated a set of tones over which transmission will occur. The set of sub-carriers allocated to a remote station n is denoted $S_n$. By ensuring that the sets of tones allocated to the different users do not overlap intra-cell interference can be avoided. The cardinality of the set $S_n$ is denoted $K_n$. Because the sets are not overlapping, holds that $\Sigma_n K_n \leq K$, where K is the total number of sub-carriers in the communication channel between the base station 202 and all remote stations 204, 206, 208.

Data for each of the remote stations $x_N$ is provided according to the sub-carriers $K_N$ allotted to each remote station The data is provided to a physical resource mapper 210. The output of the physical resource mapper, which includes the data over all channel sub-carriers K, is provided to an inverse fast Fourier transform calculation block 212 (such as an inverse Fourier transform (IFFT) block) to place the data in the time domain. The IFFT block 212 performs an IFFT operation on all data over all sub-carriers K, and the base stations 202 adds the cyclic prefix to the OFDM symbols at a cyclic prefix block 214. The OFDM symbols are transmitted over all channel sub-carriers K to the remote stations 204, 206, 208.

Although the equalization techniques described herein do not require the use of a cyclic prefix, it will be understood that a cyclic prefix may still be added to each symbol. The addition of a cyclic prefix in combination with the equalization techniques described below may result in a balance of each technique. For example, the shorter the cyclic prefix (or even the absence of a cyclic prefix) may increase the complexity of the hardware in the receiver in order to perform the equalization. On the other hand, the longer the cyclic prefix, the greater the decrease in the data-rate. Accordingly, it should be understood that while the cyclic prefix is not required, the cyclic prefix may be retained in order to reduce the hardware complexity in the receiver. In any event, the cyclic prefix does not have an effect on the equalization technique itself.

Referring again to FIG. 3, the vector $x_N = [x_N(1) \ldots x_N(K_N)]$ denotes the data intended for remote station N, and the vector $y_n = [y_N(1) \ldots y_N(K+L_{CP})]$ denotes the data or symbol received at the remote station N, where the length of the cyclic prefix is denoted as $L_{CP}$. The vector $h_N = [h_N(1), \ldots h_N(L_{channel})]$ denotes the impulse response of the downlink channel from the base station 202 to the remote station.

Figure 4:
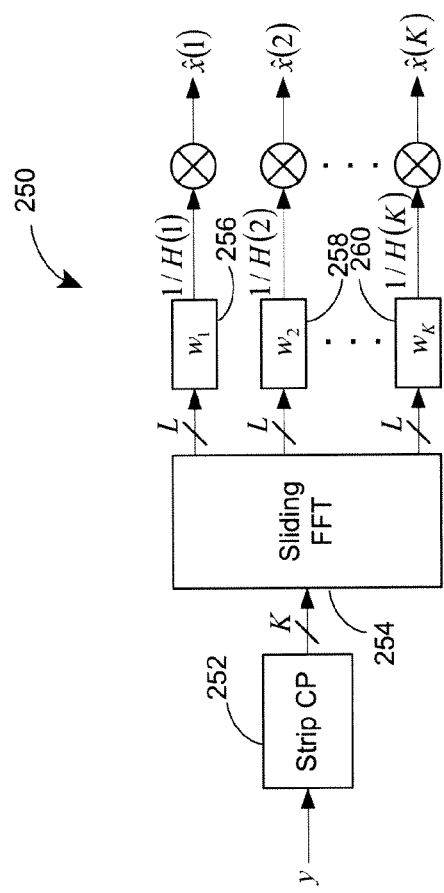
FIG. 4 is a block diagram of an example per-tone equalization for a single access receiver.

FIG. 4 is a block diagram of an example equalization technique applied per sub-carrier, referred to herein as per-tone equalization (PTE), in a receiver of a single access communication system. Whereas time domain equalization applies the same equalization filter to every sub-carrier in the communication channel in the time domain such that the equalization filter had to work equally well for all sub-carriers in the channel, per-tone equalization applies an equalization filter to each sub-carrier in the frequency domain. As a result, each equalization filter may be designed specifically for the corresponding sub-carrier frequency. Because each sub-carrier is equalized independently, the problem becomes convex, thereby allowing the system to find the globally optimal solution, rather than becoming trapped in local optima.

Figure 2:
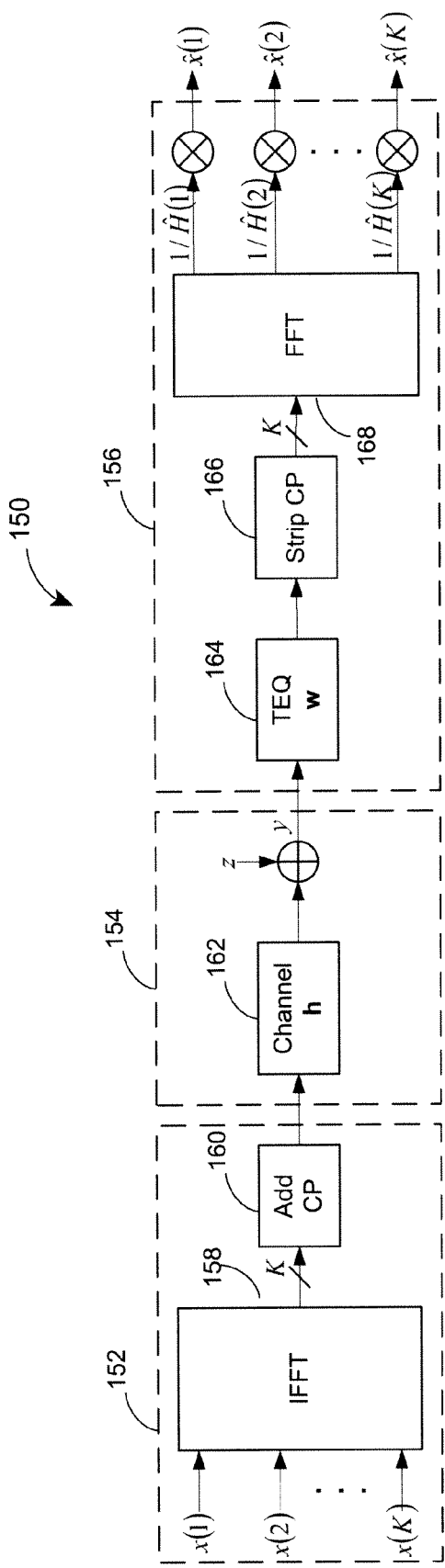
FIG. 2 is a block diagram of a prior art OFDM wireline communication system.

As discussed with reference to FIG. 4, the per-tone equalization technique is described with reference to a single-access receiver. A portion of the receiver is shown to demonstrate an example of the per-tone equalization technique. As with the receiver 156 of FIG. 2, the symbols y received at the remote station are stripped of the cyclic prefix at a cyclic prefix strip block 252. The cyclic prefix strip block 252 output is provided to a sliding fast Fourier transform calculation block 254 (such as a sliding Fourier transform (FFT) block) to which the cyclic prefix strip block 252 is coupled. The sliding FFT block 254 performs a sliding FFT operation on the symbols in the set of K sub-carriers in the channel and converts the symbols to the frequency domain.

Equalization filters $w_1 \ldots w_K$ 256, 258, 260, such as finite impulse response (FIR) filters, are provided at the output of the sliding FFT 254. Each filter 256, 258, 260 has a length L, such that $w_K$ is a vector of length L. In effect, the per-tone equalizers $w_1 \ldots w_K$ implement time domain equalization on each sub-carrier in the frequency domain. For example, if $w_K = w \forall k$, then the per-tone equalization becomes equivalent to the time domain equalization.

Figure 1:
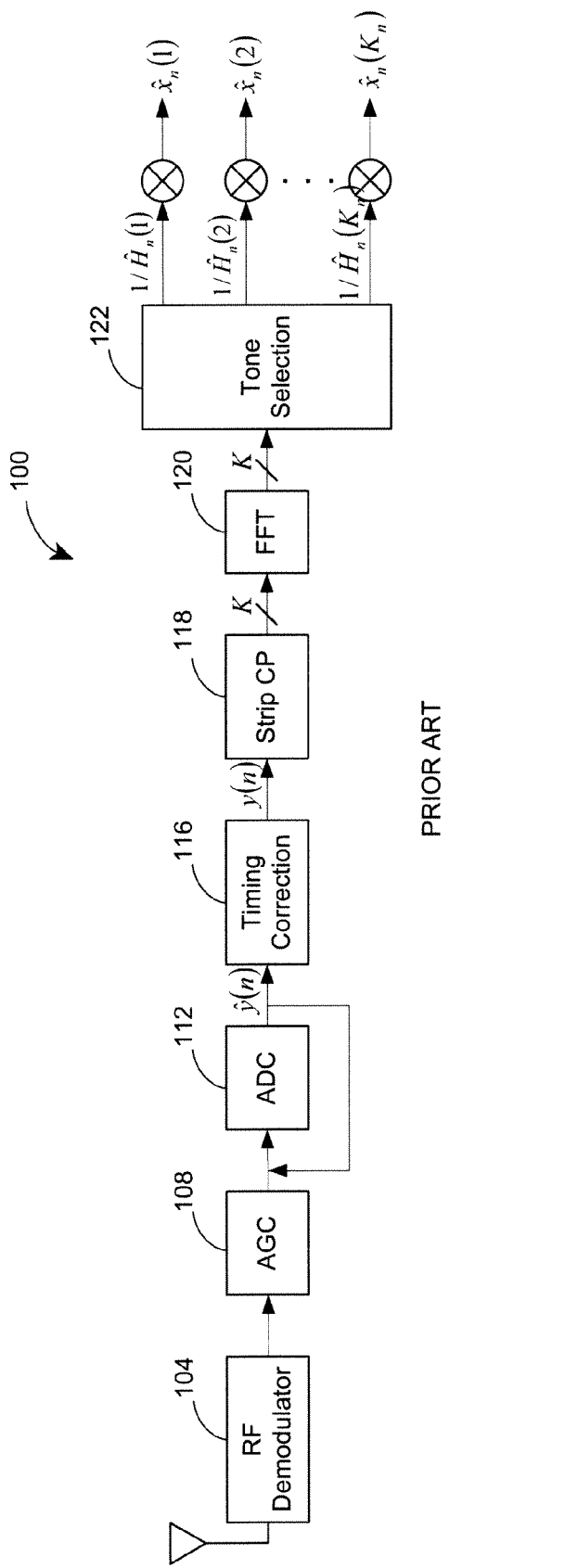
FIG. 1 is a block diagram of a prior art OFDMA wireless receiver.

The per-tone equalization allows the equalizer to be designed for each sub-carrier independently. This simplifies the problem associated with designing the equalization coefficients, as is the case with time domain equalization in single access communication systems (i.e., one receiver per channel), such as DSL. As a result, per-tone equalization is generally more flexible and results in better performance than time domain equalization. Further, by using a sliding FFT 254, the complexity of the per-tone equalization is on the same order as time domain equalization. However, it should be understood that the sliding FFT 254 may be replaced with the fast Fourier transform blocks, as shown in FIG. 1, or any other transformation function to move from the time domain to the frequency domain.

It is noted that the computational complexity, memory or other hardware requirements for per-tone equalization may be significant, and higher than the computational and memory requirements for time domain equalization. Specifically, in time domain equalization, the same equalization filter is applied to all sub-carriers in a channel, which is adequate for single-access systems. However, with per-tone equalization, a different equalization filter is applied to each sub-carrier. For example, if each sub-carrier uses a length L filter, the computational and memory requirements are increased from L+K for time domain equalization to LK for per-tone equalization. If a time domain equalizer uses 10 taps (i.e., 10 coefficients) for all sub-carriers, per-tone equalization uses 10 taps for each sub-carrier. In a channel divided into 1000 sub-carriers, per-tone equalization requires 10000 taps or coefficients among all equalization filters, which may significantly increase the computational and memory requirements for per-tone equalization as compared to time domain equalization. In single access communication systems, such as DSL or those that use OFDM, the computational and memory requirements for per-tone equalization may be more pronounced given that the equalization is applied at the receiver to all sub-carriers in the channel.

However, those computational and memory requirements may be reduced in a multiple access system, such as an OFDMA communication system. In particular, the receivers in a multiple access system generally use only a subset of the available sub-carriers in a channel and decodes the data sent to the receiver on those sub-carriers. As a result, OFDMA receivers can apply per-tone equalization to only those sub-carriers that are allotted to the receiver, thereby reducing the computational and memory requirements and other hardware resources.

Figure 5:
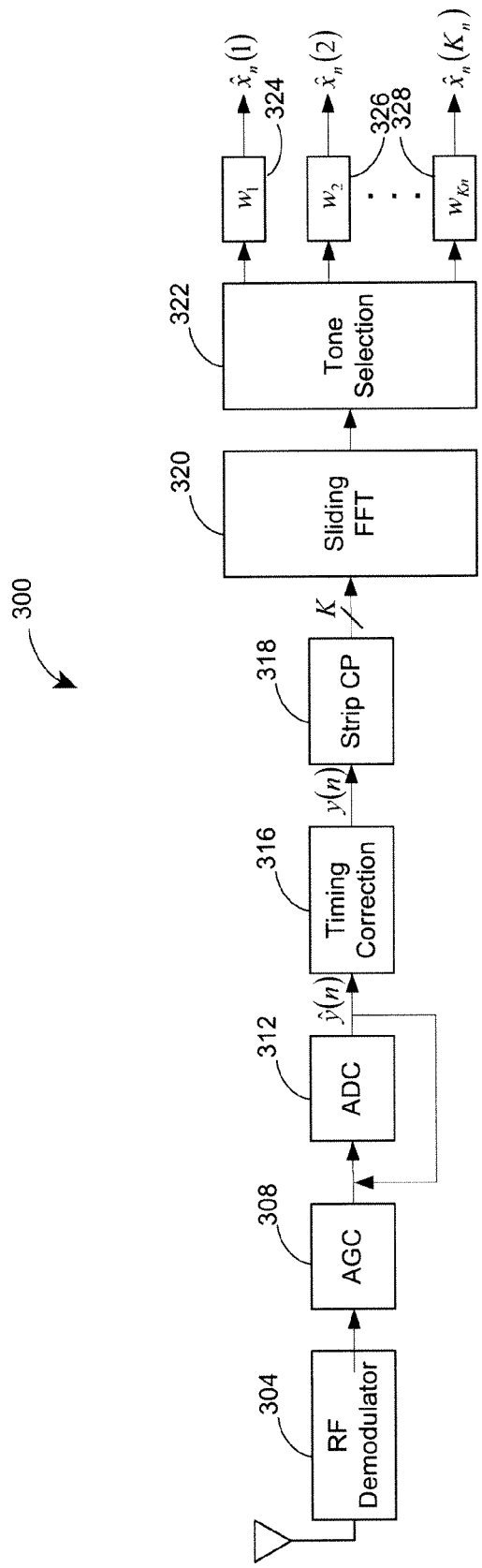
FIG. 5 is a block diagram of an example OFDMA wireless receiver implementing per-tone equalization.

FIG. 5 is a block diagram of an example OFDMA receiver 300 incorporating per-tone equalization. The receiver 300 includes elements corresponding to those of the receiver 100 of FIG. 1, with the exception that a sliding fast Fourier transform calculation block 320 (such as a sliding fast Fourier transform (FFT) block) may be provided in place of the fast Fourier transform calculation block. The sliding FFT block 320 performs a sliding FFT operation on the symbols in the set $S_n$ of sub-carriers K in the channel and converts the symbols to the frequency domain. However, because a receiver in a multiple access communication system is allotted a set $S_n$ of the sub-carriers K corresponding to the receiver's data, a fast Fourier transform may be implemented as a partial fast Fourier transform. Likewise, a sliding fast Fourier transform may be implemented as a partial sliding fast Fourier transform. The partial fast Fourier transform or partial sliding fast Fourier transform may be utilized given that there are only certain frequencies (tones or sub-carriers) of interest, such that a Fourier transform need not be implemented at other frequencies and a partial transform is less complex than a full transform.

The tones or sub-carriers allotted to the receiver 300 are selected at a tone selection block 322. Additionally, the receiver 300 includes equalization blocks 324, 326, 328 for each sub-carrier. The equalization blocks 324, 326, 328 are coupled to the tone selection block 322. As described in more detail above, the equalization blocks 324, 326, 328 equalize each sub-carrier allotted to the receiver 300.

As previously discussed, each receiver in a multiple access communication system, such as each remote station in a OFDMA cellular system, is allotted a set $S_n$ of sub-carriers K from the communication channel with the number of sub-carriers allotted to the receiver expressed as $K_n$. Because the receiver 300 decodes only the data intended for that receiver, the per-tone equalization may be applied to just those sub-carriers in the allotted set of sub-carriers $S_n$. If the length L of a filter such as a finite impulse response (FIR) filter, is used for per-tone equalization on each sub-carrier, the computational and memory requirements may be reduced from LK, as in a single access system receiver, to $LK_n$ in the multiple access system. Again, the length of the filter L is an expression of complexity the filter, such as the number of coefficients or taps in the filter equation, and is used herein merely for explanatory purposes, but not meant as a limitation in describing the filter.

For a multiple access transmitter communicating with N receivers, the number of sub-carriers allocated to the $n^{th}$ user is $$K_n \approx \frac{K}{N},$$

where K is the total number of sub-carriers in the communication channel. As a result, for a multiple access transmitter communicating with many receivers N, such as the base station communicating with many remote stations in cell, the computational and memory requirements for each receiver is generally $$\frac{LK}{N}$$

(or $LK_n$) as compared to the computational and memory requirements LK of a single access receiver. As an example, in a communication channel having 1000 sub-carriers, an OFDMA receiver with a 10-tap filter applied to 10 sub-carriers on which the receiver is active results in a total of 100 filter coefficients stored or computed by the receiver. This compares to 10000 filter coefficients stored or computed by an OFDM (single access) receiver.

The computational complexity and memory requirements on an OFDMA receiver utilization per-tone equalization may be further reduced by accounting for the variation in severity of ISI from one sub-carrier to another. In effect, the benefit of filtering ISI, whether using per-tone equalization or other equalization, also varies from one sub-carrier to another. In particular, the number of coefficients (or taps) $L_k$ used on sub-carrier k may be varied dynamically based on the severity of ISI on the sub-carrier. For example, the per-tone equalization may be applied to those sub-carriers experiencing a greater degree of interference, and switched off for those sub-carriers that do not experience much ISI. In another example, the number of coefficients for the equalization filter applied to each sub-carrier may be varied, with the number of taps or coefficients used to equalize a sub-carrier with higher ISI being greater than the number of taps or coefficients used to equalize a sub-carrier with lower ISI.

Accordingly, the receiver 300 may include hardware to the extent needed for equalizing a subset $\overline{K}_n$ of the sub-carriers $K_n$ allotted to the receiver, and the per-tone equalizer equalizes the subset of sub-carriers $\overline{K}_n$, rather than equalizing all sub-carriers $K_n$ allotted to the receiver. This further reduces the computational complexity, memory and other hardware requirements of the receiver 300 needed to support $LK_n$ coefficients. Instead, the receiver hardware need only support $\overline{K}_n L + (K - \overline{K})$ coefficients. This allows an L-tap per-tone equalizer to be applied on $\overline{K}_n$ sub-carriers, whereas a 1-tap equalizer (e.g., the inverse of channel $\hat{H}_n(k)$) may be applied on the remaining sub-carriers $K_n - \overline{K}_n$.

In order to determine the sub-carriers to which per-tone equalization will be applied when initializing the receiver, the data-rate may be maximized, thereby attempting to attain optimal performance. The data-rate maximum may be expressed as:

$$\max_{L_1 \ldots L_K} \sum_k b_{n,k}(L_{n,k}) \qquad \text{(equ. 2)}$$

In the above equation, $b_{n,k}(L_{n,k})$ denotes the data rate of receiver n on sub-carrier k when an $L_{n,k}$-tap per-tone equalization is used. On the other hand, $b_{n,k}(1)$ is interpreted as the data-rate achieved with a 1-tap frequency equalization. Using the above equation, the data-rate for the receiver may be maximized for each sub-carrier, and the sub-carriers to which per-tone equalization will be applied are chosen in order to maximize the data rate. The data-rate is generally subject to the constraints of available memory and processing power, which may be expressed as:

$$\text{s.t.} \sum_k L_{n,k} \leq \overline{K}_n L + (K_n - \overline{K}_n) \qquad \text{(equ. 3)}$$

As noted above, the number of sub-carriers on which per-tone equalization is active need not be restricted to the same number of coefficients, and the number of taps on each sub-carrier may take values other than 1-tap equalization. Accordingly, per-tone equalization may be applied as needed to each sub-carrier allotted to the receiver, subject only to the hardware constraints of the receiver, as expressed in the above equation, for example.

In practice, it may be difficult to evaluation the function $b_{n,k}(.)$ precisely. Instead, the following approximations may be used:

$$b_{n,k}(L) \approx \log_2\left(1 + \frac{\text{signal}_{n,k}}{\sigma_{n,k}^2}\right) \quad \text{(equ. 4)}$$

$$b_{n,k}(1) \approx \log_2\left(1 + \frac{\text{signal}_{n,k}}{ISI_{n,k} + \sigma_{n,k}^2}\right) \quad \text{(equ. 5)}$$

The above two equations are expressed in terms of power (e.g., power spectral density), where $\text{signal}_{n,k}$ refers to the power of the signal for receiver n on sub-carrier k, $\sigma_{n,k}$ refers to the power of the signal-to-noise ratio for receiver n on sub-carrier k, and $ISI_{n,k}$ refers to the power of the inter-symbol interference for receiver n on sub-carrier k. Each of these teens may measured using a training sequence send by the transmitter at the beginning of each transmission frame, derived from the measured channel impulse response $h_n$ for receiver n, or otherwise obtained using techniques known to those skilled in the art.

Equation 4 is an approximation of the data-rate for receiver n when performing per-tone equalization on sub-carrier k, with the assumption that ISI is removed or otherwise negligible. Equation 5 is an approximation of the data-rate for receiver n when not performing per-tone equalization on sub-carrier k, where the interference $ISI_{n,k}$ on that sub-carrier k is added as an extra term to the signal-to-noise ratio $\sigma_{n,k}$ in the denomination.

Directly determining the signal $\text{signal}_{n,k}$ and inter-symbol interference $ISI_{n,k}$ power spectral densities from the channel impulse response $h_n$ may be highly complex. The complexity for these terms may be reduced by using the following approximations:

$$\text{signal}_{n,k} = |H_{n,signal}(k)|^2 p_k \quad \text{(equ. 6)}$$

$$ISI_{n,k} = |H_{n,ISI}(k)|^2 p_k \quad \text{(equ. 7)}$$

In the above two equations, $p_k$ is the transmit power spectral density on sub-carrier k. At this point, the signal channel and inter-symbol interference channel are estimated to determine (or approximate) the frequency response of each. The frequency domain response of the signal channel $H_{n,signal}(k)$, and the frequency domain response of the inter-symbol interference channel $H_{n,ISI}(k)$ may be defined as follows:

$$H_{n,signal}(k) = \lfloor H_{n,signal}(1) \ldots H_{n,signal}(K)\rfloor = \text{fft}(h_{n,signal}) \quad \text{(equ. 8)}$$

$$H_{n,ISI}(k) = \lfloor H_{n,ISI}(1) \ldots H_{n,ISI}(K)\rfloor = \text{fft}(h_{n,ISI}) \quad \text{(equ. 9)}$$

In the above two equations, fft(.) denotes a fast Fourier transform. The term $h_{n,signal}$ may be expressed as of $h_{n,signal} = \lfloor h_{n,signal}(1) \ldots h_{n,signal}(K)\rfloor$, which denotes the part the impulse response that lies within the cyclic prefix:

$$h_{n,signal} = \begin{cases} h_n[1] & 1 \leq L_{CP} \\ 0 & 1 > L_{CP} \end{cases} \quad \text{(equ. 10)}$$

From the above equation, $h_n$ is the overall impulse response of the channel for the receiver n. As discussed generally above, the channel impulse response (e.g., the length of the channel) is the time between a first part of a short pulse being received and the last part of the pulse being received. The channel impulse response may be measured through spatial sampling. As expressed in the above equation, the part of the impulse response that falls within the length of the cyclic prefix is used as the impulse response of the signal channel $h_{n,signal}$ with all parts of the impulse response $h_n$ falling outside the cyclic prefix length being set to zero.

The teem $h_{n,ISI}$ may be expressed as $h_{n,ISI} = \lfloor h_{n,ISI}(1) \ldots h_{n,ISI}(K)\rfloor$, which denotes the part of the impulse response that lies outside the cyclic prefix:

$$h_{n,ISI} = \begin{cases} 0 & 1 \leq L_{CP} \\ h_n[1] & 1 > L_{CP} \end{cases} \quad \text{(equ. 11)}$$

As expressed in the above equation, the part of the impulse response that falls outside the length of the cyclic prefix is used as the impulse response of the ISI channel $h_{n,ISI}$ with all parts of the impulse response $h_n$ falling inside the cyclic prefix length being set to zero.

From Equations 10 and 11, the impulse response of the signal and ISI channels are obtained. Using Equations 8 and 9, the fast Fourier transform of the signal channel $h_{n,signal}$ and the ISI channel $h_{n,ISI}$ may be performed to obtain the frequency domain response of the signal channel $H_{n,signal}(k)$ and of the ISI channel $H_{n,ISI}(k)$. From there, the signal and ISI terms are known for Equations 4 and 5 in order to obtain the data-rates $b_{n,k}(L_{n,k})$ and $b_{n,k}(1)$, respectively.

Now that each of the terms from Equation 2 have been defined or approximated using Equations 4-11, the per-tone equalization initialization, as expressed as a maximum data-rate for each sub-carrier k in Equation 2, be can used to determine those sub-carriers $\overline{K}_n$ for which per-tone equalization will be applied, subject to the hardware constraints expressed in Equation 3. An example of an initialization may be performed as follows and incorporated as an algorithm for the receiver. In particular, for each sub-carrier k, the difference in data-rate $\Delta b_{n,k}$ between the data-rate $b_{n,k}(L)$ for receiver n when performing per-tone equalization and the data-rate $b_{n,k}(1)$ for receiver n when not performing per-tone equalization is calculated (i.e., $\Delta b_{n,k} = b_{n,k}(L) - b_{n,k}(1)$). It should be noted that even though per-tone equalization is not performed in the data-rate $b_{n,k}(1)$ equalization may still be performed using, for example, 1-tap equalization (e.g., the inverse of channel $\hat{H}_n(k)$) in order to obtain the symbols. The difference in data-rate $\Delta b_{n,k}$ may be simplified using $2^{\Delta b_{n,k}}$, which removes the logarithmic operation from the equation with little impact on performance. In particular:

$$2^{\Delta b_{n,k}} = \frac{\text{signal}_{n,k} + \sigma_{n,k}^2}{\text{signal}_{n,k} + ISI_{n,k} + \sigma_{n,k}^2}\left(1 + \frac{ISI_{n,k}}{\sigma_{n,k}^2}\right) \quad \text{(equ. 12)}$$

The sub-carriers $K_n$ may be sorted in decreasing order by $\Delta b_{n,k}$. For those sub-carriers $\overline{K}_n$ with the highest $\Delta b_{n,k}$, per-tone equalization may be applied, because those sub-carriers experience the greatest decrease in data-rate due to ISI. In order to maximize the overall data-rate for the receiver, those sub-carriers $\overline{K}_n$ should be equalized. The sub-carriers experiencing the greatest decrease in data-rate may be selected based on available computing resources in the receiver. Accordingly, the number of sub-carriers selected as having the highest $\Delta b_{n,k}$ may be dynamic and varied to achieve different trade-offs between performance and complexity. The remaining sub-carriers $K_n - \overline{K}_n$ may be equalized using less complex equalization, such as 1-tap (e.g., the inverse of channel $\hat{H}_n(k)$). Alternatively, all sub-carriers $K_n$ allotted to the receiver may have per-tone equalization applied according to varying complexity based upon the degree to which ISI affects the data-rate on each sub-carrier, whereby sub-carriers experiencing greater ISI are equalized using more complex (i.e., higher taps or coefficients) equalization filters than sub-carriers experiencing less ISI.

By utilizing per-tone equalization in the multiple access receiver 300, it is possible to realize an appreciable increase in the data-rate as compared to utilizing an extended cyclic prefix. For example, previous or proposed multiple access communication systems increased the cyclic prefix by as much as 18% of the overall as compared to the standard cyclic prefix, the data-rate was thereby reduced by 18%. In a receiver 300 that implements per-tone equalization, as well as retaining the standard cyclic prefix in order to balance hardware complexity with data-rate (see Equation 3), the data-rate may realize an increase of 18% over using the extended cyclic prefix. Further, as compared to single access systems, such as OFDM DSL, implementing per-tone equalization in multiple access systems, such as OFDMA WiMAX or 3G LTE, has less of an effect on the computation complexity and memory requirements of the receivers. This may be further realized by dynamically applying per-tone equalization to those sub-carriers that are most affected by ISI in a manner that maximizes the data-rate.

Each of the blocks of the remote station shown in FIG. 5 may be implemented as machine-readable instructions executed by a processor. Such instructions may be stored in a memory coupled to the processor or in any other desired computer-readable medium.

For illustrative purposes, the equalization techniques described above were in the context of a WiMAX system, which employs orthogonal frequency-division multiple-access to modulate the communicated data. However, similar equalization techniques also may be applied in systems employing other modulation techniques. It will also be appreciated that equalization methods and apparatus such as described above may provide for equalization to be developed entirely or partially within a base station or in any other suitable centralized or distributed location.

Although examples in the context of WiMAX (i.e., 802.16a/d/e) were discussed above, these equalization techniques may be utilized in other contexts as well such as digital audio broadcast (DAB) systems and digital video broadcast (DVB) systems. More generally, techniques such as described above can be utilized in any multiple access synchronous communication system.

Figure 6A:
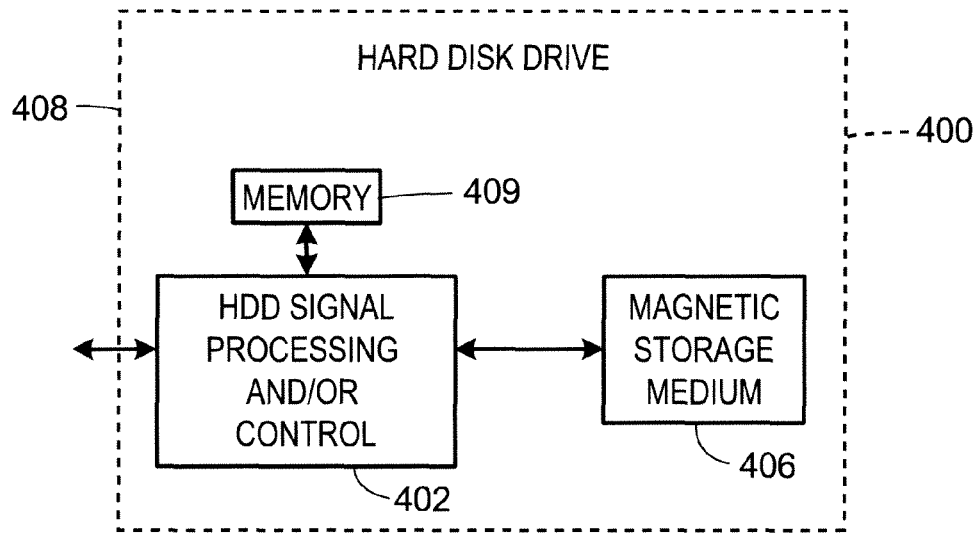
FIGS. 6A-6H illustrate examples of various different devices in which a wireless communication system implementing the antenna selection and training techniques described herein may be used.

Referring to FIG. 6A, the equalization techniques may be used with a hard disk drive 400 which includes both signal processing and/or control circuits, which are generally identified in FIG. 6A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408 which may implement the equalization techniques described above. HDD 400 may be connected to memory 409, such as a random access memory (RAM), a low latency nonvolatile memory such as flash memory, read only memory (ROM) and/or other suitable electronic data storage.

Figure 6B:
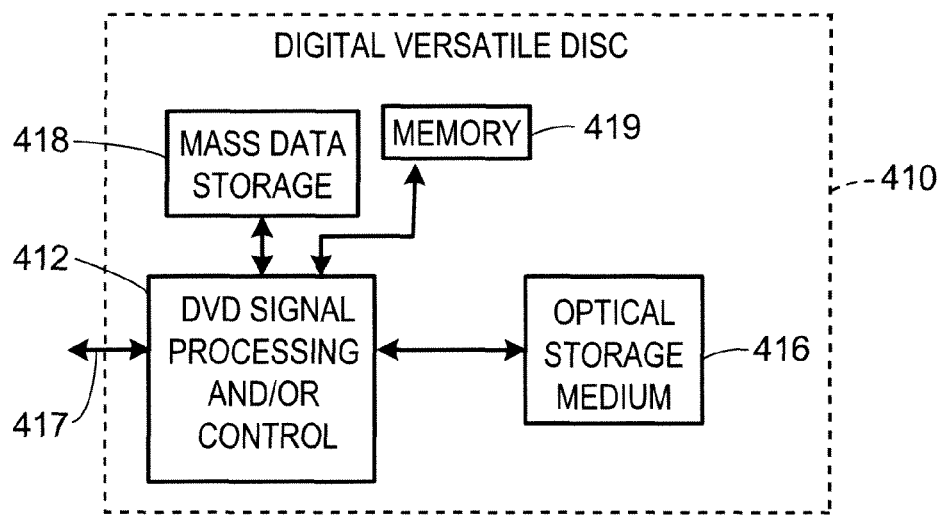

Referring now to FIG. 6B, the equalization techniques may be embodied in or used with a digital versatile disc (DVD) drive 410 which may include either or both signal processing and/or control circuits, which are generally identified in FIG. 6B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417 which may be implemented using the equalization techniques described above. DVD 410 may communicate with mass data storage 418 that stores data in a nonvolatile manner. Mass data storage 418 may include a hard disk drive (HDD) such as that shown in FIG. 6A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

The equalization techniques described above may be utilized in various MIMO devices, or any OFDM-based communication system that estimate channel gain. For example, equalization techniques such as described above may be utilized in base stations, access points, wireless routers, etc. Additionally, FIGS. 6A-6F illustrate various devices in which equalization techniques such as described above, may be employed. Although the above has references many aspects of the WiMAX IEEE 802.16(x) communication standards, it should be understood that the equalization techniques may also be applied to different wireless standards, including, but not limited to, IEEE Standard 802.11(x), Digital Video Broadcasting-Terrestrial (DVB-T), Digital Audio Broadcasting (DAB), and Long Term Evolution (LTE).

Figure 6C:
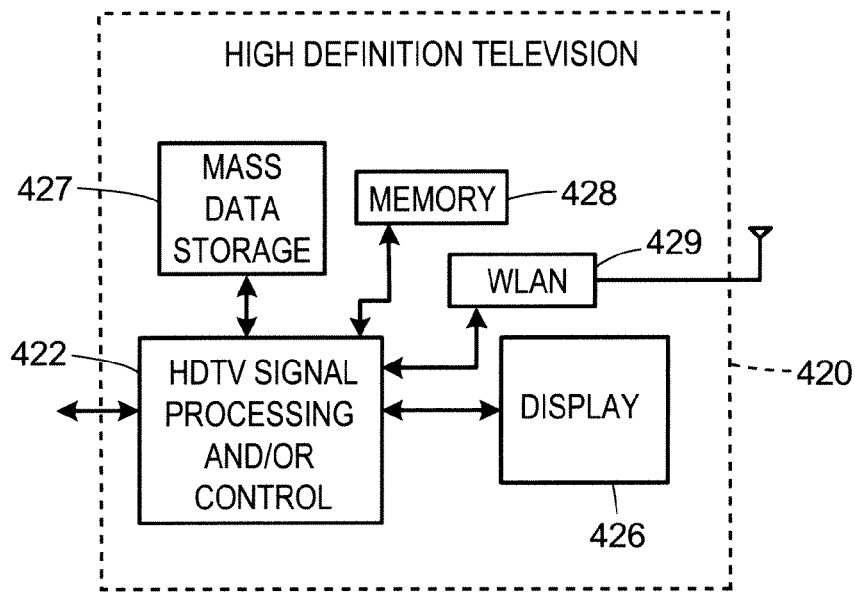

Referring now to FIG. 6C, the equalization techniques may be embodied in a high definition television (HDTV) 420 which may include either or both signal processing and/or control circuits, which are generally identified in FIG. 6C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429 which may implement the equalization techniques described above.

Figure 6D:
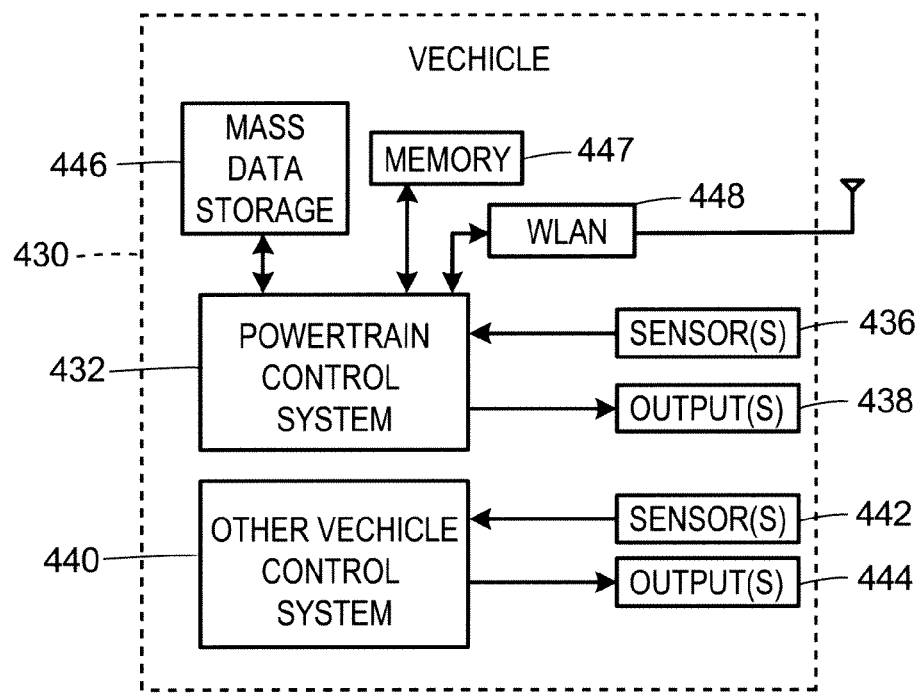

Referring now to FIG. 6D, the equalization techniques may be used in conjunction with a control system of a vehicle 430 having a WLAN interface and/or mass data storage. In some implementations, the equalization techniques may be used within a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The equalization techniques may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448 which may implement the equalization techniques described above. The control system 440 may also include mass data storage, memory and/or a WLAN interface (all not shown).

Figure 6E:
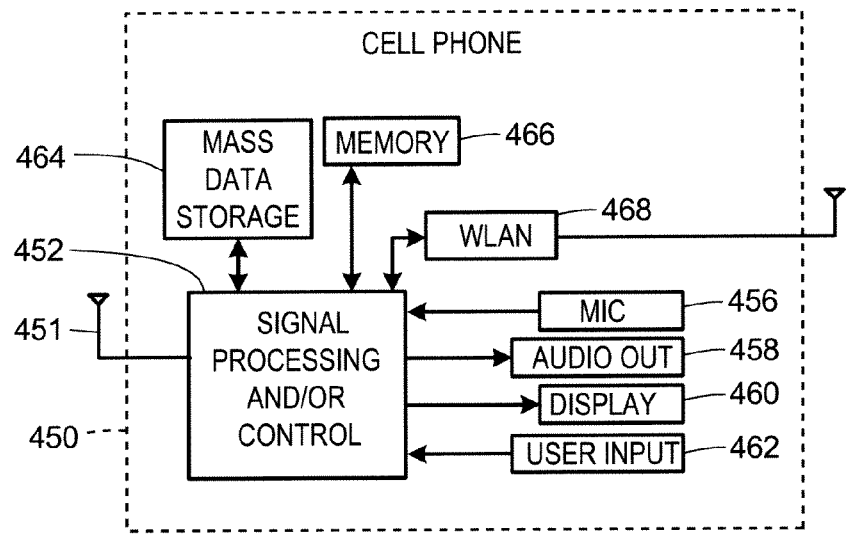

Referring now to FIG. 6E, the equalization techniques may be embodied in a cellular phone 450 that may include one or more cellular antennas 451, either or both signal processing and/or control circuits, which are generally identified in FIG. 6E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 6F:
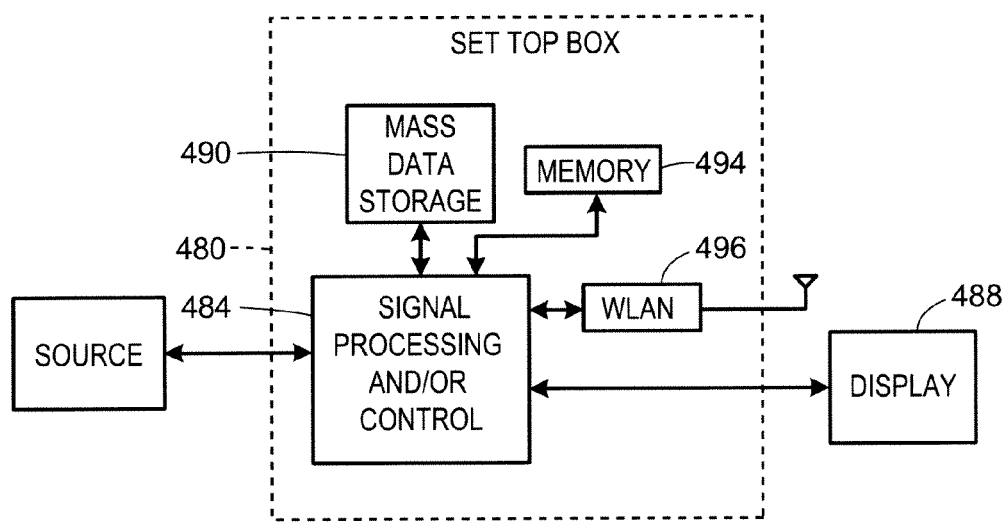

Referring now to FIG. 6F, the equalization techniques may be embodied in a set top box 480 including either or both signal processing and/or control circuits, which are generally identified in FIG. 6F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496 which may implement the equalization techniques described herein.

Figure 6G:
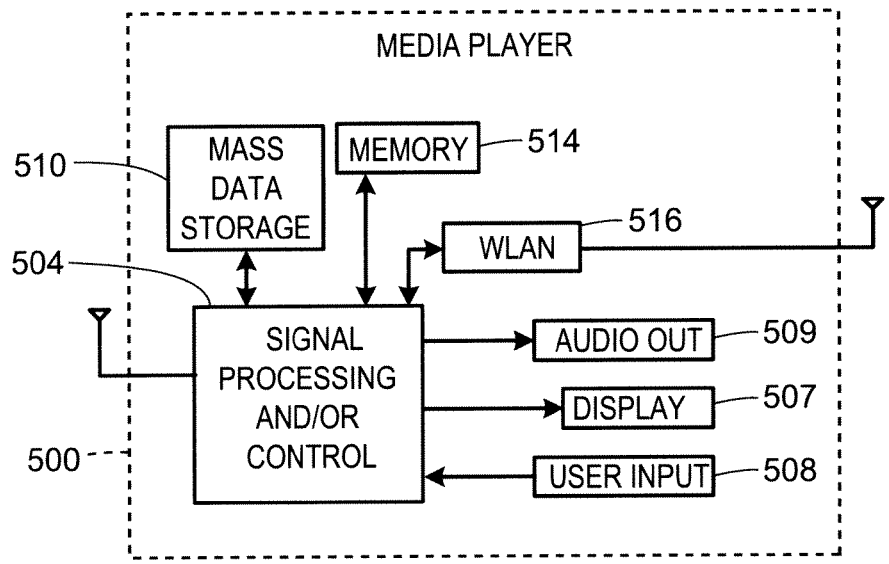

Referring now to FIG. 6G, the equalization techniques may be embodied in a media player 500. The equalization techniques may implement either or both signal processing and/or control circuits, which are generally identified in FIG. 6G at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516 which may implement the equalization techniques described herein. Still other implementations in addition to those described above are contemplated.

Figure 6H:
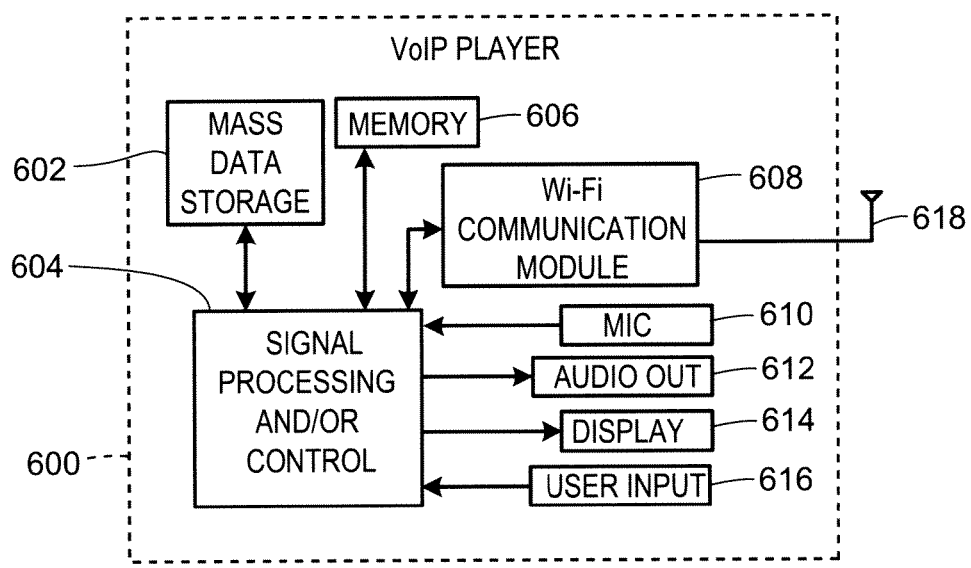

Referring to FIG. 6H, the equalization techniques may be embodied in a Voice over Internet Protocol (VoIP) phone 600 that may include one or more antennas 618, either or both signal processing and/or control circuits, which are generally identified in FIG. 6H at 604, and a wireless interface and/or mass data storage of the VoIP phone 600. In some implementations, VoIP phone 600 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 600 may process data, perform coding and/or encryption, perform calculations, format data and/or perform other VoIP phone functions.

VoIP phone 600 may communicate with mass data storage 602 that stores data in a nonvolatile manner such as optical and/or magnetic storage devices, for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". VoIP phone 600 may be connected to memory 606, which may be a RAM, ROM, low latency nonvolatile memory such as flash memory and/or other suitable electronic data storage. VoIP phone 600 is configured to establish communications link with a VoIP network (not shown) via Wi-Fi communication module 608 which may implement the equalization techniques described herein.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

Moreover, while the equalization techniques have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of equalization within a communication system having i) a first transceiver device and ii) a plurality of second transceiver devices, wherein the first transceiver device communicates with each of the second transceiver devices via a subset of frequency sub-carriers allotted to each second transceiver device, the method comprising:

receiving a data transmission over the subset of frequency sub-carriers, wherein the communication channel between first transceiver device and the plurality of second transceiver devices is partitioned in a plurality of frequency sub-carriers of which the frequency sub-carriers allotted to a second transceiver device is a subset;

transforming the data transmission from a time-domain transmission to a frequency domain transmission;

selecting one or more of the frequency sub-carriers within the subset of frequency sub-carriers; and applying a separate equalization filter to each of the frequency sub-carriers within the subset of frequency sub-carriers, wherein the equalization filter applied separately to each of the selected frequency sub-carriers comprises a multi-coefficient equalization filter, and wherein the equalization filter for each of unselected frequency sub-carriers comprises a single-coefficient equalization filter.

2. The method of claim 1, wherein selecting one or more of the frequency sub-carriers comprises:

calculating a difference in data-rate for each frequency sub-carrier in the subset, wherein the difference in data-rate comprises the difference between a data-rate accounting for equalization on the frequency sub-carrier and a data-rate that does not account for equalization on the frequency sub-carrier; and selecting one or more of the frequency sub-carriers within the subset based on the corresponding difference in data-rate, wherein the selected frequency sub-carriers comprises a difference in data-rate higher than a difference in data-rate for unselected frequency sub-carriers; and calculating an equalization filter for each of the selected frequency sub-carriers.

3. The method of claim 2, wherein the equalization filter applied to a given frequency sub-carrier is independently calculated for that frequency sub-carrier.

4. The method of claim 1, wherein applying a separate equalization filter for each of the frequency sub-carriers comprises applying an equalization filter having dynamically adapted coefficients based on a severity of inter-symbol interference (ISI) experience on the respective frequency sub-carrier.

5. The method of claim 1, wherein transforming the data transmission from a time-domain transmission to a frequency domain transmission comprises performing a sliding fast Fourier transform on the data transmission.

6. The method of claim 1, wherein transforming the data transmission from a time-domain transmission to a frequency domain transmission comprises performing a partial sliding fast Fourier transform on the data transmission.

7. The method of claim 1, wherein the equalization filter comprises an N-tap finite impulse response filter.

8. The method of claim 1, wherein the first transceiver device comprises a cellular base station and the second transceiver device comprises a remote cellular transceiver.

9. The method of claim 1, wherein the communication system comprises an Orthogonal Frequency-Division Multiple Access (OFDMA) system.

10. The method of claim 1 wherein the communication system comprises a 3rd Generation Partnership Project Long Term Evolution (3G LTE) system or a Worldwide Interoperability for Microwave Access (WiMAX) system.

11. A method of per-tone equalization in a transceiver of a multi-access communication system, wherein the multi-access communication system comprises a plurality of tones allocated among a plurality of transceivers without overlap and each transceiver communicates among the allocated plurality of tones, the method comprising:

receiving a data transmission over the plurality of tones allocated to the transceiver;

transforming the data transmission from a time-domain transmission to a frequency domain transmission; and applying an equalization filter to each tone allocated to the transceiver based on a severity of inter-symbol interference on the data-rate for the tone, wherein applying the equalization filter comprises independently applying an equalization filter to selected ones of the tones allocated to the transceiver based on a difference in data-rate between a data-rate accounting for equalization on the tone and a data-rate that does not account for equalization on the tone.

12. The method of claim 11, further comprising calculating an approximation of the difference in data-rate on each of the tones allotted to the transceiver, the approximation expressed as:

$$\Delta b_{n,k} = b_{n,k}(L) - b_{n,k}(1),$$

wherein $\Delta b_{n,k}$ comprises the difference in data-rate for a $k^{th}$ tone allotted to an $n^{th}$ transceiver, $b_{n,k}(L)$ comprises the data-rate for the $n^{th}$ transceiver when performing equalization on the $k^{th}$ tone, $b_{n,k}(1)$ comprises the data rate for the $n^{th}$ transceiver without performing equalization on the $k^{th}$ tone, and L corresponds to the number of coefficients for an equalization filter uses to perform the equalization.

13. The method of claim 12, further comprising:

calculating an approximation of the data-rate for the transceiver for each of the tones allotted to the transceiver when performing equalization; and calculating an approximation of the data-rate for the transceiver for each of the tones allotted to the transceiver without performing equalization, wherein the approximation of the data-rate when performing equalization is expressed as:

$$b_{n,k}(L) \approx \log_2\left(1 + \frac{\text{signal}_{n,k}}{\sigma_{n,k}^2}\right),$$

wherein the approximation of the data-rate without performing equalization is expressed as:

$$b_{n,k}(1) \approx \log_2\left(1 + \frac{\text{signal}_{n,k}}{\text{ISI}_{n,k} + \sigma_{n,k}^2}\right), \text{ and}$$

wherein $\text{signal}_{n,k}$ comprises the power of the signal for the $n^{th}$ transceiver on the $k^{th}$ tone, $\sigma_{n,k}$ comprise the power of the signal-to-noise ratio for the $n^{th}$ transceiver on the $k^{th}$ tone, and $\text{ISI}_{n,k}$ comprises the power of the inter-symbol interference for the $n^{th}$ transceiver on the $k^{th}$ tone.

14. The method of claim 13, further comprising:

calculating the power of the signal for each of the tones allotted to the transceiver; and calculating the power of the inter-symbol interference for each of the tones allotted to the transceiver, wherein the power of the signal is expressed as:

$$\text{signal}_{n,k} = |H_{n,\text{signal}}(k)|^2 p_k,$$

wherein the power of the inter-symbol interference is expressed as:

$$\text{ISI}_{n,k} = |H_{n,ISI}(k)|^2 p_k, \text{ and}$$

wherein $H_{n,\text{signal}}(k)$ comprises a frequency domain response of a signal channel, $H_{n,ISI}(k)$ comprises a frequency domain response of an inter-symbol interference channel, and $p_k$ comprises transmit power spectral density on the $k^{th}$ tone.

15. The method of claim 14, further comprising:

calculating the frequency domain response of the signal channel as a fast Fourier transform of an impulse response of the signal channel for the transceiver; and calculating the frequency domain response of the inter-symbol interference channel as a fast Fourier transform of an impulse response of the inter-symbol interference channel for the transceiver, wherein the frequency domain response of the signal channel is expressed as:

$$H_{n,\text{signal}}(k) = [H_{n,\text{signal}}(1) \ldots H_{n,\text{signal}}(K)] = \text{fft}(h_{n,\text{signal}}),$$

and wherein the frequency domain response of the inter-symbol interference channel is expressed as:

$$H_{n,ISI}(k) = [H_{n,ISI}(1) \ldots H_{n,ISI}(K)] = \text{fft}(h_{n,ISI}).$$

16. The method of claim 15, wherein the impulse response of the signal channel comprises a portion of the impulse response of the communication channel falling within the length of a cyclic prefix appended to the beginning of the data transmission received by the transceiver, and wherein the impulse response of the inter-symbol interference channel comprises a portion of the impulse response of the communication channel falling outside the length of the cyclic prefix.

17. The method of claim 11, further comprising selecting the selected ones of the tones allocated to the transceiver based on a maximization of the data-rate for the transceiver, the maximization of the data-rate expressed as:

$$\max_{L_1 \ldots L_K} \sum_k b_{n,k}(L_{n,k}),$$

wherein $b_{n,k}(L_{n,k})$ comprises the data rate of the $n^{th}$ transceiver on the $k^{th}$ tone when an $L_{n,k}$-tap equalization is utilized.

18. The method of claim 17, wherein the maximization of the data-rate for the transceiver is subject to limitations of the selected ones of the tones, the unselected ones of the tones, and the number of coefficients of the equalization filter, the constraints expressed as:

$$s \cdot t \cdot \Sigma_k L_{n,k} \leq \overline{K_n} L + (K_n - \overline{K_n}).$$

19. An apparatus for equalizing an orthogonal frequency-division multiple access (OFDMA) signal, the apparatus comprising:

a sliding fast Fourier transform unit adapted to transform a pre-Fourier transform OFDMA signal from the time domain to a post-Fourier transform OFDM signal in the frequency domain;

a per-tone equalizer adapted to apply an equalization filter to each tone allocated to the apparatus by a transmission apparatus, wherein the per-tone equalizer is adapted to apply the equalization filter based on a severity of inter-symbol interference on the data-rate associated with each tone allocated to the apparatus, and wherein the per-tone equalizer is adapted to independently apply an equalization filter to selected ones of the tones allocated to the apparatus based on a difference in data-rate between a data-rate accounting for equalization on the tone and a data-rate that does not account for equalization on the tone.

20. The apparatus of claim 19, wherein the per-tone equalizer is adapted to approximate the difference in data-rate on each of the tones allotted to the apparatus as a function of an approximation of the data-rate for the apparatus for each of the tones allotted to the apparatus when performing equalization and approximation of the data-rate for the apparatus for each of the tones allotted to the apparatus without performing equalization.

21. The apparatus of claim 20, wherein the per-tone equalizer is adapted to approximate the data-rate for the apparatus for each of the tones allotted to the apparatus when performing equalization as a function of the power of the signal for each of the tones allotted to the apparatus, and approximate the data-rate for the apparatus for each of the tones allotted to the apparatus without performing equalization as a function of the power of the inter-symbol interference for each of the tones allotted to the apparatus.

22. The apparatus of claim 21, wherein the per-tone equalizer is adapted to calculate the power of the signal for each of the tones allotted to the apparatus as a function of a frequency domain response of a signal channel, and calculate the power of the inter-symbol interference for each of the tones allotted to the apparatus as a function of an inter-symbol interference channel.

23. The apparatus of claim 22, wherein the per-tone equalizer is adapted to calculate the frequency domain response of the signal channel as a fast Fourier transform of an impulse response of the signal channel for the apparatus, and calculate the frequency domain response of the inter-symbol interference channel as a fast Fourier transform of an impulse response of the inter-symbol interference channel for the apparatus.

24. The apparatus of claim 23, wherein the impulse response of the signal channel comprises a portion of the impulse response of the communication channel falling within the length of a cyclic prefix appended to the beginning of the data transmission received by the apparatus, and wherein the impulse response of the inter-symbol interference channel comprises a portion of the impulse response of the communication channel falling outside the length of the cyclic prefix.

25. The apparatus of claim 19, wherein the per-tone equalizer is adapted to select the selected one of the tones allocated to the apparatus based on a maximization of the data-rate for the apparatus.

26. The apparatus of claim 25, wherein the maximization of the data-rate for the apparatus is subject to limitations of the selected ones of the tones, the unselected ones of the tones, and the number of coefficients of the equalization filter.

* * * * *